United States Patent [19]

Zwicker

[11] Patent Number: 4,606,528

[45] Date of Patent: Aug. 19, 1986

[54] MOTORIZED HAND TORCH WITH IMPROVED BRAKE MECHANISM

[75] Inventor: Roger D. Zwicker, Arlington, Tex.

[73] Assignee: Victor Equipment Company, Denton, Tex.

[21] Appl. No.: 727,148

[22] Filed: Apr. 25, 1985

[51] Int. Cl.$^4$ ............................................. B23K 7/10
[52] U.S. Cl. ...................................... 266/66; 266/67; 266/70
[58] Field of Search ............................. 266/66, 67, 70

[56] References Cited

U.S. PATENT DOCUMENTS

| | | | |
|---|---|---|---|
| 3,071,361 | 1/1963 | Jacobs | 266/66 |
| 3,396,957 | 8/1968 | Rowland | 266/66 |
| 4,014,528 | 3/1977 | Sugiyama | 266/66 |
| 4,469,311 | 9/1984 | Laing | 266/67 |

Primary Examiner—Wayland Stallard
Attorney, Agent, or Firm—Majestic, Gallagher, Parsons & Siebert

[57] ABSTRACT

A motorized hand torch with an improved brake mechanism is provided. The brake mechanism includes a brake lever which is manually actuable to either a locked or an unlocked position. The brake lever, in turn, has a cam portion thereon which moves a pivotally mounted leaf spring so as to selectively lock a mounting bracket supporting a drive wheel whereby straight line cutting may be accomplished. A circle cutting attachment is also provided which includes a means for preventing locking the mounting bracket.

13 Claims, 5 Drawing Figures

MOTORIZED HAND TORCH WITH IMPROVED BRAKE MECHANISM

FIELD OF THE INVENTION

This invention relates to semi-automatic gas cutting machines that are powered to move in a controlled manner over the surface of a workpiece.

DESCRIPTION OF THE PRIOR ART

This invention is directed to an improvement over the motorized hand torch disclosed and claimed in assignee's U.S. Pat. No. 4,469,311 issued on Sept. 4, 1984 for an invention entitled "Motorized Hand Torch." In that patent, there is described a semi-automatic motorized hand torch, or gas cutting machine, that is capable of being freely operated with one hand. The patented invention is characterized by: a device head having a cutting torch tip; respective conduit means for supplying preheat oxygen, cutting oxygen, and fuel gas to the tip; a drive cylinder journaled for rotation about the tip; and a drive wheel engaging the peripherally outer cylindrical wall of the drive cylinder so as to be driven thereby and movable longitudinally therealong so as to allow adjustment in height of the tip. Also included is a motor and transmission drivingly connected to the drive cylinder and control means for controlling the motor. In addition, a bracket for supporting the drive wheel adjacent the tip is retained in position by means of a retention thumb screw so as to permit the bracket to be retained in a predetermined position when it is desired that the hand torch move in a straight line. By releasing the retention thumb screw, the bracket is allowed to rotate through 360° for cutting circles.

The retention thumb screw thus described projects from the housing of the patented invention and is therefore not as compact as may be desired. In addition, position visual indication of the locked versus unlocked condition is not present with this type of retention mechanism, albeit that such can be determined readily by feel or touch. For these and other reasons, an improved brake means for selectively locking the retaining bracket in a predetermined position is desirable.

SUMMARY AND OBJECTS OF THE INVENTION

Accordingly, it is an object of this invention to provide the semi-automatic motorized hand torch that has an improved brake means.

It is a further object of this invention to provide a motorized hand torch brake means that is compact and contained substantially within the housing.

It is a still further object to provide the improved brake means for a motorized hand torch that gives a visual indication of the locked versus unlocked position.

It is a still further object of this invention to provide an improved brake means for a motorized hand torch that provides more positive locking.

The invention takes the form of a motorized hand torch with an improved brake mechanism. A brake mechanism is provided whereby a brake lever is manually actuable to either a locked or an unlocked position. The brake lever, in turn, has a cam portion thereon which moves a pivotally mounted leaf spring so as to selectively lock a mounting bracket supporting a drive wheel whereby straight line cutting may be accomplished. Circle cutting may be accomplished through use of a circle cutting attachment.

DESCRIPTION OF THE PREFERRED EMBODIMENTS

Figure 1:
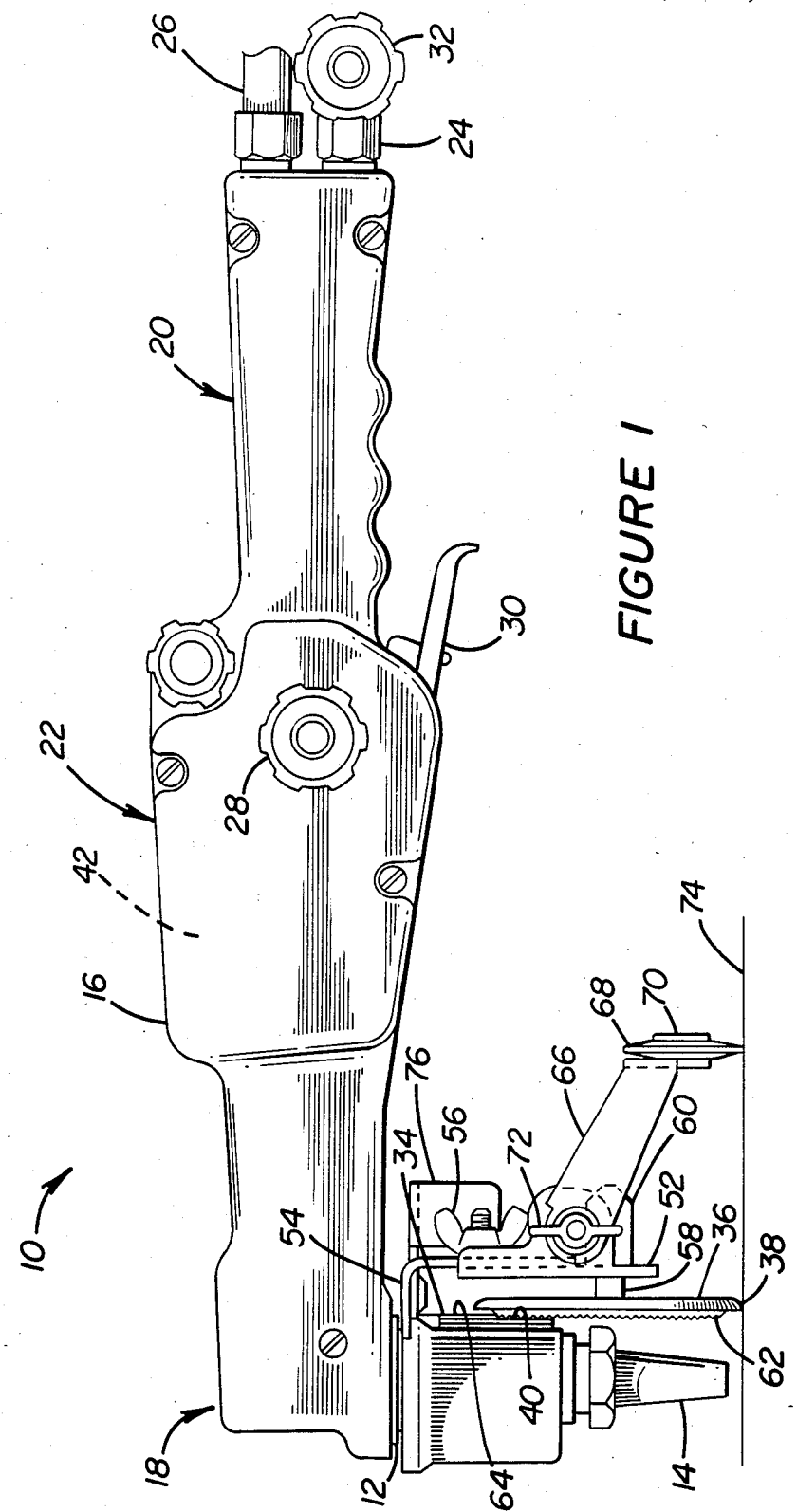
FIG. 1 is a side elevation view of the invention.
Figure 3:
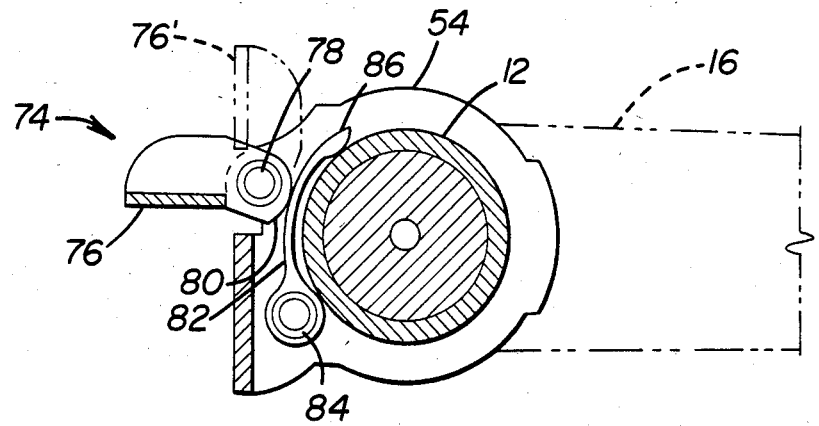
FIG. 3 is a cross-sectional view taken along lines III—III in FIG. 2 to show details of the brake means.
Figure 2:
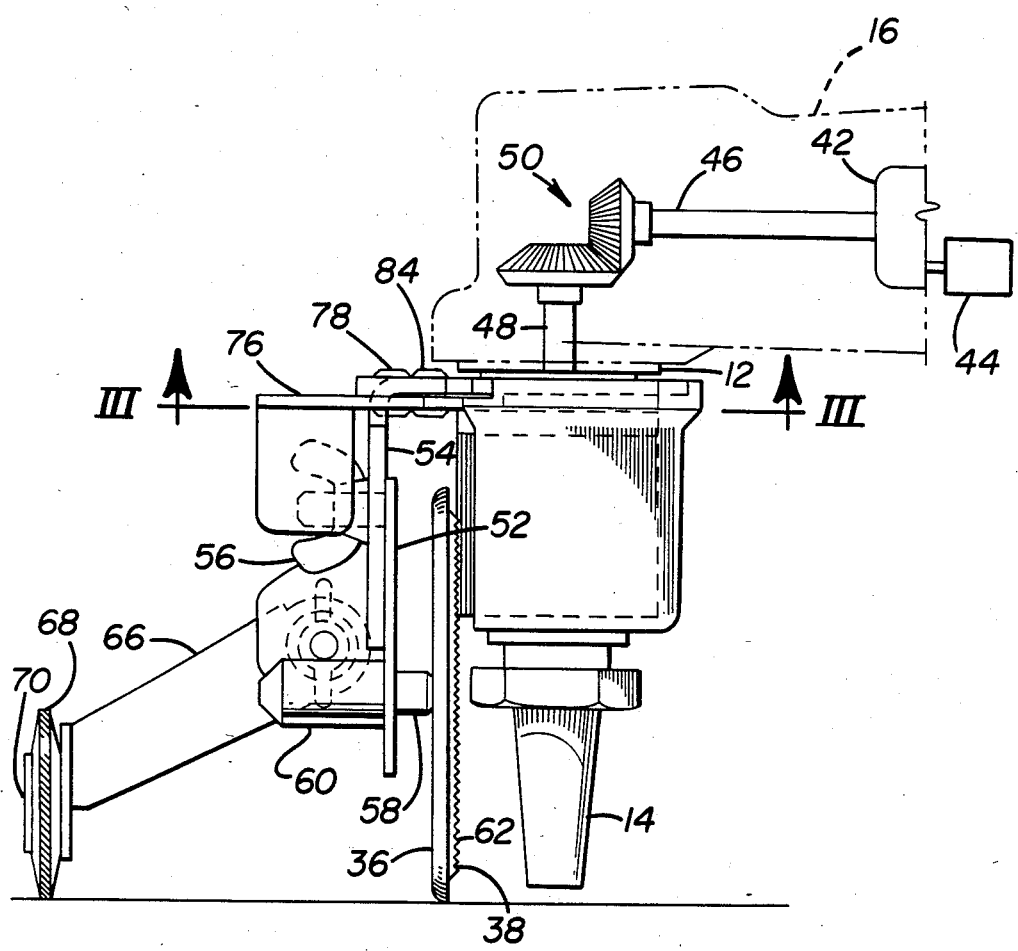
FIG. 2 is a partial end elevation view with the housing rotated 180°.

Referring to the drawings, there is shown in FIGS. 1-3 a device in the form of a motorized hand torch or gas cutting machine. The device shown generally at 10 includes a device head 12 having a cutting touch tip 14 threadably mounted therein. The device head is mounted at the forward end of a generally elongated housing or body 16 having a forward, head portion 18 and a rear, handle portion 20 and an intermediate body portion 22. Reference is hereby made to assignee's U.S. Pat. No. 4,469,311, the disclosure of which is hereby expressly incorporated by reference which shows the motorized hand torch in detail.

A pair of conduits 24, 26 supplying fuel and oxidizer, respectively, enter the housing at the rear handle portion 20. The fuel and oxidizer for a cutting operation are typically gases such as acetylene and oxygen. While the following description talks in terms of fuel and oxygen oxidizer, it is to be understood that other oxidizers are also within the contemplation of this invention. Gas control is provided by means of a preheat oxygen valve 28, a cutting oxygen valve (not shown) actuated by a trigger or handle 30, and a fuel valve 32.

The device also includes a drive cylinder 34 journaled for rotation about the vertical axis defined by the torch tip 14. A drive wheel 36 is positioned so that an annular projection 38 thereof engages a peripherally outer cylindrical wall 40 of the drive cylinder so as to be driven thereby as best seen in FIG. 2. Means hereinafter described are provided whereby the drive wheel is adjustable longitudinally along the drive cylinder so as to allow height adjustment of the torch tip with respect to the workpiece to be cut. This also allows the angle of cutting to be adjusted. A motor 42 is contained within the intermediate portion of the housing.

The motor is controlled by a control system 44. Power from the motor is transmitted to the drive cylinder by means of a horizontal and a vertical drive shaft 46, 48 interconnected by a pair of bevel gears 50. The drive wheel 36 is supported by means of a drive wheel bracket 52 vertically adjustably connected to a mounting bracket 54 rotatably mounted about the device head 12. A wing nut 56 allows the bracket to be vertically adjusted, thereby adjusting the drive wheel as previously mentioned. The drive wheel is rotatably mounted on one end of a shaft 58 contained within a shaft housing 60 mounted on the bracket. Shaft 58 is spring-loaded by means of a spring (not shown) contained within the shaft housing 60 so that the drive wheel is constantly biased against the drive cylinder. Serrations or teeth 62 on the annular projection 38 of the drive wheel interact with similar serrations or teeth 64 on the drive cylinder 34 for purposes of transmitting power.

As also seen in FIG. 2, an outrigger or arm 66 is attached to bracket 52 for guidance purposes. The arm has a guide wheel 68 rotatably mounted by means of a nut 70 at the end thereof. The angle of the arm may be adjusted by means of a wing nut 72 so that the angle of the tip may be adjusted with respect to the workpiece such as the flat plate 74 shown.

Figure 5:
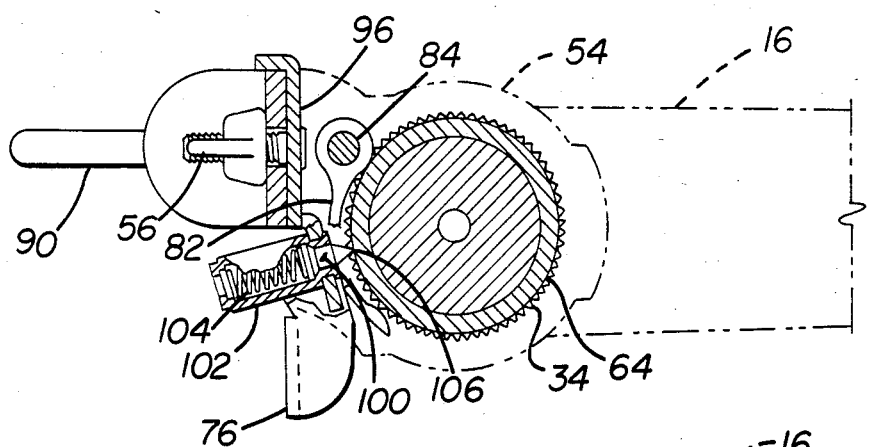
FIG. 5 is a cross-sectional view taken along lines V—V in FIG. 4 showing details of the brake means.
Figure 4:
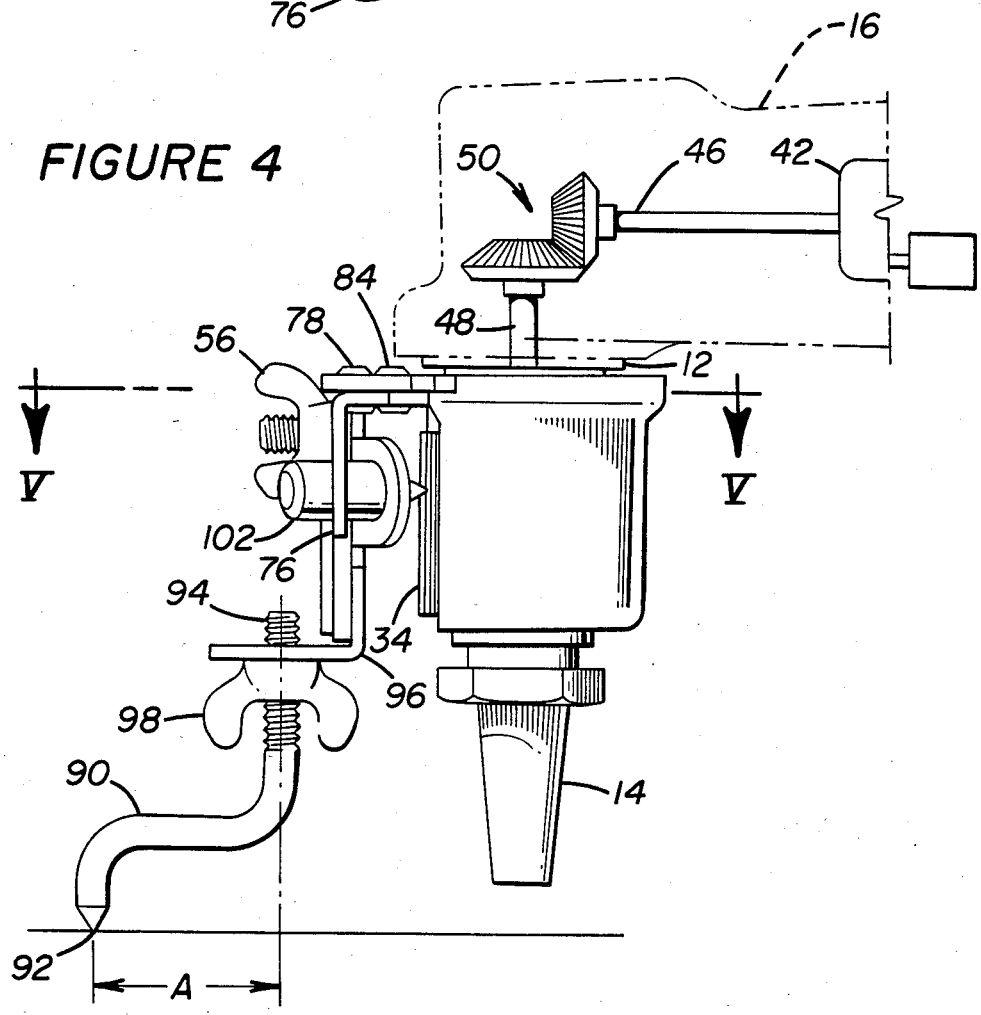
FIG. 4 is a view similar to FIG. 2 showing a second embodiment of the invention wherein a pivot rod is provided for cutting small circles.

As best seen in FIG. 3, a brake mechanism or means 74 is provided whereby the bracket 54 may be locked to the housing. The brake mechanism comprises a brake lever 76 which is rotatably mounted on a pivot 78 fixed to the bracket 54. A cam 80 on one end of the brake lever mates with a curved leaf spring 82 which is, in turn, mounted on another pivot 84 on the bracket 54. By manually rotating the brake lever from the dotted line position 76' shown in FIG. 3 to the solid line position 76, force is applied to the curved portion of the leaf spring intermediate its ends. This force is transmitted to the free end 86 of the leaf spring which presses against head 12 of the device, thereby locking same. As may be seen, when the brake lever is aligned with the vertical portion of the bracket, it is in the unlocked position. When it is 90° out of alignment, as shown, it is in the locked position. This gives visual indication of the locked versus unlocked condition.

Where circles are to be cut, a pivot mechanism is used, as shown in FIGS. 4 and 5. In this embodiment, the drive wheel is replaced by a pivot rod 90 having a pointed end 92 adapted for contacting the workpiece. The pivot rod has a threaded end 94 which is threadably engaged with a bracket 96 and held in place by means of a wing nut 98. Vertical adjustability is achieved in a manner like the first embodiment by means of wing nut 56.

As best seen in FIG. 5, a pawl 100 partially contained within a cylindrical pawl housing 102 mounted on the bracket is spring biased by means of a spring 104 contained therein. The pointed end 106 of the pawl is adapted for engaging the serrations 64 on the drive cylinder. Operation of this embodiment is similar to the aforementioned first embodiment. The brake lever 76 is manually movable from the position shown to a 90° rotated position whereby the leaf spring 82 is locked. By rotating the pivot rod 90 and locking it in place by means of wing nut 98, various preset circle diameters "A" may be cut.

As also best seen in this figure, housing 102 is dimensioned and mounted on bracket 96 so as to be in the path of movement of and prevent lever 76 from being moved to the locked position. This prevents unwanted locking of the brake mechanism.

In operation, the motorized hand torch is actuated by means of the control system 44. The drive wheel 36 engages the outer wall 40 of the drive cylinder and drives along a predetermined path with the bracket set in a fixed position by engaging the brake means. If the arm 66 is set at a desired angle by means of the wing nut 72, the torch tip 14 will be similarly inclined and an angular cut will be made. Similarly, if a circle cutting attachment shown in FIGS. 4 and 5 is connected, the tip will be moved about the central point in a circle. Height can be adjusted by the wing nut 56 as described hereinbefore.

It is to be understood that while the invention has been described above in conjunction with the preferred specific embodiment thereof, the description is intended to illustrate and not limit the scope of the invention, which is defined by the scope of the appended claims.

I claim:

1. A machine for cutting comprising:
   a housing;
   a device head mounted on said housing and having a cutting torch tip;
   conduit means for supplying fuel and oxidizer to said torch tip;
   a drive cylinder mounted for rotation about said device
   a motor;
   power transmission means operatively connecting said motor with said drive cylinder so as to drive said drive cylinder in response to said motor;
   control means for controlling said motor;
   bracket means mounted for rotation about said device head;
   locking means on said device head for selectively locking said bracket means to said housing whereby said bracket means is restrained from rotating about said device head,
   a circle cutting attachment mounted on said bracket means; and
   means for preventing locking of said bracket means when said circle cutting attachment is mounted on said bracket means.

2. The invention of claim 1 wherein said circle cutting attachment comprises a pivot attached to said bracket means and means on said bracket means selectively engageable with said drive cylinder whereby said bracket means rotates about said head and thereby imparts a circular motion to said tip about said pivot.

3. The invention of claim 2 wherein said selectively engageable means comprises a generally elongated rod having pawl means thereon engageable with cooperating means on said drive cylinder.

4. The invention of claim 3 wherein said locking means comprises brake means selectively engageable by a manually operable lever.

5. The invention of claim 4 further including means on said bracket means for preventing locking of said brake means.

6. The invention of claim 4 wherein said brake means comprises a curved leaf spring pivotally mounted at one end thereof and cam means on said lever for selectively moving said leaf spring into locking relation with said device head.

7. The invention of claim 3 wherein said pawl means comprises a pawl housing, a pawl partially contained within said pawl housing, and spring means within said housing biasing said pawl into engagement with said cooperating means on said drive cylinder.

8. A machine for cutting comprising:
   a housing;
   a device head mounted on said housing and having a cutting torch tip;
   conduit means for supplying fuel and oxidizer to said torch tip;
   a drive cylinder mounted for rotation about said device head;
   a motor;
   power transmission means operatively connecting said motor with said drive cylinder so as to drive said drive cylinder in response to said motor;
   control means for controlling said motor;
   bracket means mounted for rotation about said device head; and locking means for selectively locking said bracket means to said housing whereby said bracket means is restrained from rotating about said head;

said locking means comprising a brake means selectively engageable by a manually operable lever.

9. The invention of claim 8 wherein said brake means comprises a curved leaf spring pivotally mounted at one end thereof and cam means on said lever for selectively moving said leaf spring into locking relation with said device head.

10. The invention of claim 8 further including:

a circle cutting attachment mounted on said bracket means; and means for preventing locking of said bracket means when said circle cutting attachment is mounted on said bracket means.

11. The invention of claim 10 wherein said circle cutting attachment comprises a pivot attached to said bracket means and means on said bracket means selectively engageable with said drive cylinder whereby said bracket means rotates about said head and thereby imparts a circular motion to said tip about said pivot.

12. The invention of claim 11 wherein said selectively engageable means comprises a generally elongated rod having pawl means thereon engageable with cooperating means on said drive cylinder.

13. The invention of claim 12 wherein said pawl means comprises a pawl housing, a pawl partially contained within said pawl housing, and spring means within said housing biasing said pawl into engagement with said cooperating means on said drive cylinder.

* * * * *

UNITED STATES PATENT AND TRADEMARK OFFICE
CERTIFICATE OF CORRECTION

PATENT NO. : 4,606,528

DATED : Aug. 19, 1986

INVENTOR(S) : Zwicker

It is certified that error appears in the above-identified patent and that said Letters Patent is hereby corrected as shown below:

Column 4, lines 10 and 11: insert --head;-- after "device".

Signed and Sealed this

Twenty-eighth Day of October, 1986

[SEAL]

*Attest:*

DONALD J. QUIGG

*Attesting Officer*     *Commissioner of Patents and Trademarks*